(12) United States Patent
Yan et al.

(10) Patent No.: US 11,783,317 B2
(45) Date of Patent: Oct. 10, 2023

(54) TRANSACTION PROCESSING BASED ON DEVICE LOCATION

(71) Applicant: Block, Inc., San Francisco, CA (US)

(72) Inventors: Haipeng Yan, Whitby (CA); Emad Bidari, Toronto (CA); Bertram Leesti, Toronto (CA); Afshin Rezayee, Richmond Hill (CA)

(73) Assignee: Block, Inc., Oakland, CA (US)

( * ) Notice: Subject to any disclaimer, the term of this patent is extended or adjusted under 35 U.S.C. 154(b) by 0 days.

(21) Appl. No.: 17/514,651

(22) Filed: Oct. 29, 2021

(65) Prior Publication Data

US 2022/0230162 A1 Jul. 21, 2022

Related U.S. Application Data

(63) Continuation of application No. 16/218,216, filed on Dec. 12, 2018, now Pat. No. 11,182,770.

(51) Int. Cl.
*H04B 5/00* (2006.01)
*G06Q 20/32* (2012.01)
*H04B 5/02* (2006.01)

(52) U.S. Cl.
CPC ....... *G06Q 20/3278* (2013.01); *H04B 5/0031* (2013.01); *H04B 5/0043* (2013.01); *H04B 5/0075* (2013.01); *H04B 5/02* (2013.01)

(58) Field of Classification Search
CPC .............. G06Q 20/3278; H04B 5/0031; H04B 5/0043; H04B 5/0075; H04B 5/02
USPC ........................................................ 705/26.1
See application file for complete search history.

(56) References Cited

U.S. PATENT DOCUMENTS

| | | | | |
|---|---|---|---|---|
| 9,646,299 | B1* | 5/2017 | Rezayee | H04W 52/245 |
| 9,760,883 | B1* | 9/2017 | Wade | H04W 4/70 |
| 9,924,513 | B2* | 3/2018 | Sidhu | H04W 72/0453 |
| 10,033,435 | B2* | 7/2018 | Wolf | H04B 5/0031 |
| 10,198,727 | B1* | 2/2019 | Rezayee | H04L 27/12 |
| 10,255,603 | B1* | 4/2019 | Rezayee | G06Q 20/3829 |
| 10,430,784 | B1* | 10/2019 | He | H01Q 1/2216 |
| 10,482,440 | B1* | 11/2019 | White | G07G 1/0009 |
| 10,861,003 | B1* | 12/2020 | Rezayee | G06Q 20/204 |
| 11,023,878 | B1* | 6/2021 | Hernandez | G06Q 20/3224 |
| 11,182,770 | B1* | 11/2021 | Yan | H04B 5/02 |
| 11,386,424 | B2* | 7/2022 | Dicker | G06Q 20/401 |

(Continued)

OTHER PUBLICATIONS

Notice of Allowance dated Jul. 14, 2021, for U.S. Appl. No. 16/218,216, of Yan, H, et al., filed Dec. 12, 2018.

(Continued)

*Primary Examiner* — April G Gonzales
(74) *Attorney, Agent, or Firm* — Maynard Nexsen PC; Brian T. Sattizahn, Esq.

(57) ABSTRACT

A near field communication (NFC) system includes an NFC reader that communicates with a remote NFC device through load modulation. The NFC reader transmits a wireless carrier signal from an antenna and has a plurality of passive receive antennas to receive the modulated signal. The NFC reader also has circuitry to provide a plurality of data streams that define data recovered from the modulated wireless carrier signal received from the plurality of receivers. The circuitry then selects, based on a location of the NFC device relative to the NFC reader, one of the plurality of data streams for use in processing a transaction.

20 Claims, 11 Drawing Sheets

(56) References Cited

U.S. PATENT DOCUMENTS

| | | | | |
|---|---|---|---|---|
| 2007/0287498 | A1* | 12/2007 | Wang | H04L 67/564 |
| | | | | 455/556.1 |
| 2010/0033307 | A1* | 2/2010 | Narendra | G06K 19/0701 |
| | | | | 235/493 |
| 2011/0238581 | A1* | 9/2011 | Severson | G06Q 20/367 |
| | | | | 705/65 |
| 2011/0282785 | A1* | 11/2011 | Chin | G06Q 20/108 |
| | | | | 705/42 |
| 2014/0138435 | A1* | 5/2014 | Khalid | G06Q 20/227 |
| | | | | 235/380 |
| 2014/0273830 | A1* | 9/2014 | Wong | H04B 5/0031 |
| | | | | 455/41.1 |
| 2015/0044964 | A1* | 2/2015 | Khan | G06F 21/606 |
| | | | | 455/41.1 |
| 2015/0065037 | A1* | 3/2015 | Burrell | G06K 7/10237 |
| | | | | 455/41.1 |
| 2015/0278562 | A1* | 10/2015 | Adrangi | G06K 19/0718 |
| | | | | 455/41.1 |
| 2015/0381238 | A1* | 12/2015 | Wolf | H04B 5/0031 |
| | | | | 455/41.1 |
| 2016/0043779 | A1* | 2/2016 | Maeda | H04B 5/0062 |
| | | | | 455/41.1 |
| 2016/0142174 | A1* | 5/2016 | Fine | H04W 12/122 |
| | | | | 455/1 |
| 2016/0210613 | A1* | 7/2016 | McGill | G06K 19/06112 |
| 2016/0371716 | A1* | 12/2016 | Aitenbichler | G06Q 20/387 |
| 2017/0004475 | A1* | 1/2017 | White | G07G 1/0036 |
| 2017/0055303 | A1* | 2/2017 | Wang | H04W 8/22 |
| 2017/0069957 | A1* | 3/2017 | Kanno | H04B 5/0037 |
| 2017/0286992 | A1* | 10/2017 | Lounsbury, Jr. | G06Q 30/0238 |
| 2017/0290079 | A1* | 10/2017 | Raj | H04L 67/12 |
| 2017/0344976 | A1* | 11/2017 | Lee | H04W 52/34 |
| 2017/0357961 | A1* | 12/2017 | Bidari | G06Q 20/3278 |
| 2018/0025350 | A1* | 1/2018 | Grossman | G06Q 20/36 |
| | | | | 705/21 |
| 2018/0033090 | A1* | 2/2018 | Khan | G06Q 20/3278 |
| 2018/0096329 | A1* | 4/2018 | Hamilton | G06Q 20/322 |
| 2018/0097531 | A1* | 4/2018 | Kummaraguntla | H04B 1/0458 |
| 2018/0191775 | A1* | 7/2018 | Watson | H04L 63/1475 |
| 2018/0240117 | A1* | 8/2018 | Rezayee | G07F 7/0873 |
| 2019/0026724 | A1* | 1/2019 | Wade | G07F 7/1016 |
| 2019/0103925 | A1* | 4/2019 | Wade | G06Q 20/3278 |
| 2019/0172055 | A1* | 6/2019 | Hale | G06K 19/06187 |
| 2019/0207953 | A1* | 7/2019 | Klawe | G07F 7/088 |

OTHER PUBLICATIONS

Notice of Allowability dated Oct. 22, 2021, for U.S. Appl. No. 16/218,216, of Yan, H, et al., filed Dec. 12, 2018.

* cited by examiner (Top View)

(Top View)

(Top View)

(Side View)

TRANSACTION PROCESSING BASED ON DEVICE LOCATION

CROSS-REFERENCE TO RELATED APPLICATIONS

This application is a continuation of U.S. patent application Ser. No. 16/218,216, entitled "SYSTEMS AND METHODS FOR SENSING LOCATIONS OF NEAR FIELD COMMUNICATION DEVICES," filed on Dec. 12, 2018, and granted as U.S. Pat. No. 11,182,770, which is incorporated herein by reference.

BACKGROUND

Near field communication (NFC) devices are increasingly used in a variety of applications to communicate data. In NFC communication, a first NFC device is positioned sufficiently close (e.g., a few inches or less) to another NFC device, such as an NFC reader, so that the devices are inductively coupled. Load modulation is often used to communicate data. In this regard, the reader may transmit a wireless carrier signal, and the NFC device may change the impedance of its antenna circuit in order to modulate the carrier signal with data. The reader detects and demodulates the modulated signal in order to recover the data.

NFC standards require the wireless carrier signal emitted from a reader to exhibit at least a certain threshold power at any point within a specified three-dimensional (3D) test volume that extends a certain distance (e.g., about 4 centimeters) from the reader. Ensuring that the receive power of the carrier signal meets or exceeds the threshold at every point in the test volume, particularly at the boundaries of the test volume, can be problematic or result in inefficient power consumption. In this regard, one technique to ensure that the reader meets NFC specifications is to increase the reader's transmit power. However, such an increase undesirably increases the reader's power requirements, thereby reducing the useful life of its batteries. Further, reducing the reader's transmit power may affect the reader's ability to provide a suitable signal for satisfying NFC requirements at all points in the test volume. Improved techniques for enabling an NFC reader to comply with NFC standards while operating at reduced power levels are generally desired.

BRIEF DESCRIPTION OF THE DRAWINGS

The above and other features of the present disclosure, its nature and various advantages will be more apparent upon consideration of the following detailed description, taken in conjunction with the accompanying drawings in which.

DETAILED DESCRIPTION

Figure 1:
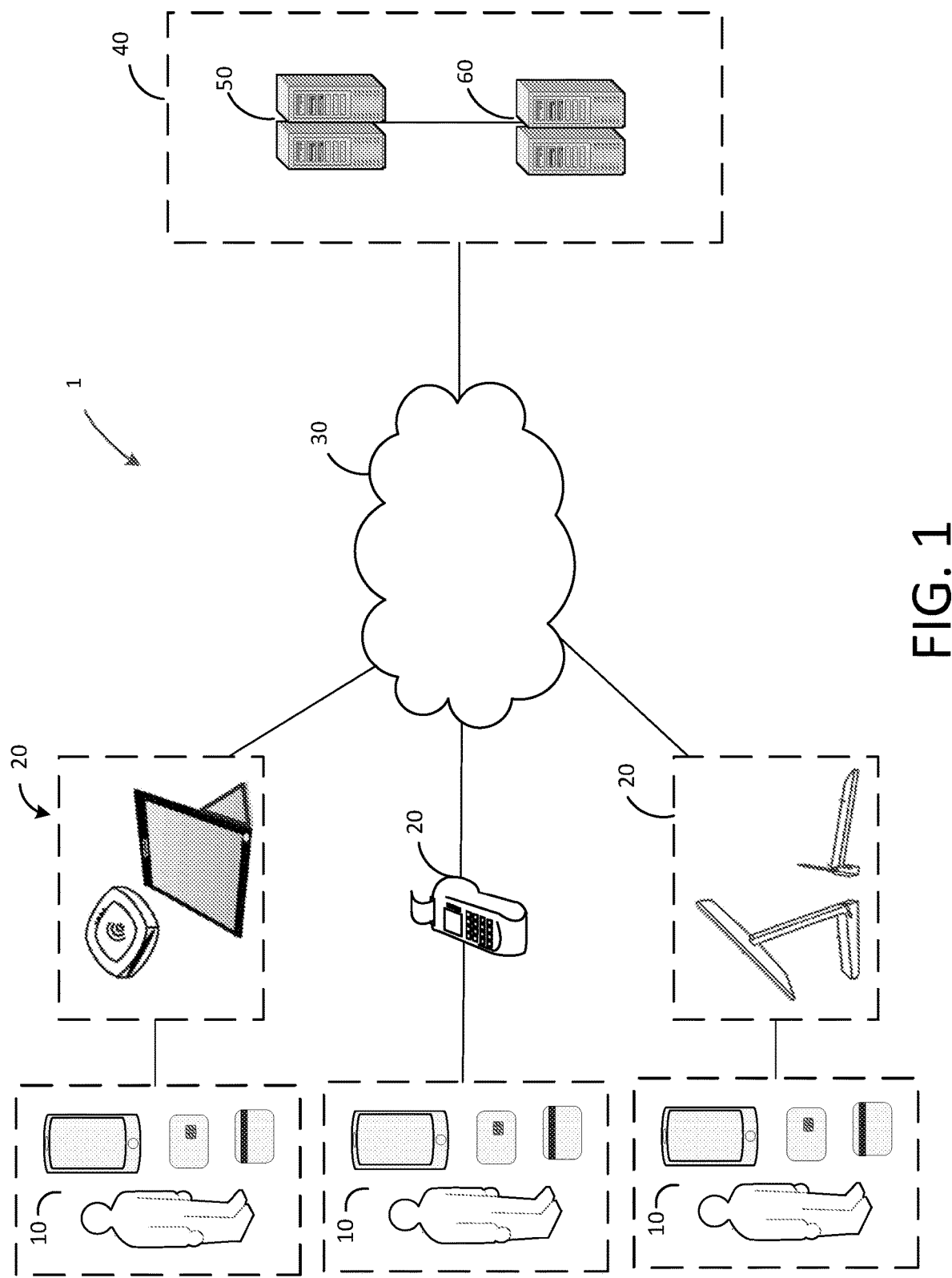
FIG. 1 shows an illustrative block diagram of a payment system in accordance with some embodiments of the present disclosure.

The present disclosure generally pertains to systems and methods for determining a location of a near field communication (NFC) device. In some embodiments of the present disclosure, an NFC reader communicates with a remote NFC device using load modulation, as described above. In this regard, the NFC reader transmits a wireless carrier signal from an antenna, and the remote NFC device modulates such carrier signal by changing its internal impedance in order to transmit data to the NFC reader. The NFC reader has at least one antenna for receiving the signal that is load modulated by the remote NFC device. This antenna is coupled to circuitry that measures a spectrum of the received signal and identifies a resonant frequency of the NFC device based on the measured spectrum. The circuitry also determines the signal's amplitude at such resonant frequency and precisely estimates the distance of the remote NFC device from the antenna and, hence, reader based on such amplitude. By estimating the precise distance of the remote NFC device from the reader, the location of the remote NFC device relative to the reader can be precisely determined, and this information may be used to operate the NFC reader more efficiently.

As an example, the precise location of the remote NFC device from the reader may be used to tune the communication characteristics of the reader such that the power of the carrier signal received by the remote NFC device from the reader is higher. Thus, the NFC reader may operate at a lower transmit power relative to the transmit power that would otherwise be required in order to ensure compliance with applicable NFC standards for certification.

In some embodiments, the NFC reader has multiple antennas that are positioned at different locations on the reader. As described above, each antenna is coupled to circuitry that precisely measures a respective distance of the remote NFC device from the antenna based on the resonant frequency identified within the spectrum of a signal received by the antenna. The distances from multiple antennas may be used to determine the location of the remote NFC device relative to the reader in three dimensional (3D) space. In other embodiments, the distance measured by the circuitry for at least one of the antennas may be combined with data from other sensors to determine the location of the remote NFC device in 3D space.

In some embodiments, one of a plurality of antennas is selected for transmitting to the remote NFC device based on the determined location of the remote NFC device relative to the reader. As an example, the antenna that is better aligned with (e.g., closest to) the remote NFC device may be selected for transmitting the reader's wireless carrier signal. Thus, the NFC reader may operate at a lower transmit power relative to the transmit power that would otherwise be required in order to ensure compliance with applicable NFC standards for certification.

In some embodiments, the circuitry that is used to measure a spectrum of the signal received from the remote NFC device may also be used for other measurements with the reader, such as analyzing a signal from a virtual cage for sensing a tamper attempt. In addition, the spectrum measured by the circuitry for at least one antenna may be used detect a device type for the remote NFC device for use in processing information from the remote NFC device. As an example, if the remote NFC device is a payment device, such as a credit card, the reader may detect a type of payment device being used for use in processing a payment transaction. To identify device type, the NFC reader may identify physical characteristics of the remote NFC that are unique relative to other device types. Such physical characteristics may include the resonant frequency and amplitude of impedance loading from the device's antenna circuit. In some cases, based on the resonant frequency identified for the remote NFC device, the reader may detect a problem with the remote NFC device, such as damage to the antenna circuit of the remote NFC device. In yet other embodiments, the information about the received signal may be used for other purposes.

For illustrative purposes, various embodiments of an NFC communication system will be described in the context of payment systems that process payment transactions. However, it should be emphasized that the concepts described herein may be applied to other types of NFC communication systems as may be desired.

FIG. 1 depicts an illustrative block diagram of a payment system 1 that utilizes NFC communication in accordance with some embodiments of the present disclosure. In one embodiment, payment system 1 includes a payment device 10, payment terminal 20, network 30, and payment server 40. In an exemplary embodiment, payment server 40 may include a plurality of servers operated by different entities, such as a payment service system 50 and a bank server 60. These components of payment system 1 facilitate electronic payment transactions between a merchant and a customer.

The electronic interactions between the merchant and the customer take place between the customer's payment device 10 and the merchant's payment terminal 20. The customer has a payment device 10, such as a credit card having a magnetic stripe, a credit card having an externally-driven processing device such as an EMV chip, or an NFC-enabled electronic device such as a smart phone running a payment application. The merchant has a payment terminal 20 such as a merchant device, payment reader, standalone terminal, combined customer/merchant terminals, electronic device (e.g., smart phone) running a point-of-sale application, or other electronic device that is capable of processing payment information (e.g., encrypted payment card data and user authentication data) and transaction information (e.g., purchase amount and point-of-purchase information).

In some embodiments (e.g., for low-value transactions or for payment transactions that are less than a payment limit indicated by an NFC or EMV payment device 10), the initial processing and approval of the payment transaction may be processed at payment terminal 20. In other embodiments, payment terminal 20 may communicate with payment server 40 over network 30. Although payment server 40 may be operated by a single entity, in one embodiment payment server 40 may include any suitable number of servers operated by any suitable entities, such as a payment service system 50 and one or more banks of the merchant and customer (e.g., a bank server 60). The payment terminal 20 and the payment server 40 communicate payment and transaction information to determine whether the transaction is authorized. For example, payment terminal 20 may provide encrypted payment data, user authentication data, purchase amount information, and point-of-purchase information to payment server 40 over network 30. Payment server 40 may determine whether the transaction is authorized based on this received information as well as information relating to customer or merchant accounts, and respond to payment terminal 20 over network 30 to indicate whether or not the payment transaction is authorized. Payment server 40 may also transmit additional information such as transaction identifiers to payment terminal 20.

Based on the information that is received at payment terminal 20 from payment server 40, the merchant may indicate to the customer whether the transaction has been approved. In some embodiments such as a chip card payment device, approval may be indicated at the payment terminal, for example, at a display device of a payment terminal. In other embodiments such as a smart phone or watch operating as an NFC payment device, information about the approved transaction and additional information (e.g., receipts, special offers, coupons, or loyalty program information) may be provided to the NFC payment device for display at a screen of the smart phone or watch or storage in memory.

During transactions involving an EMV card, the EMV card may be inserted into a card slot of the payment terminal. The terminal may make a number of electrical connections with the EMV card including, inter alia, a power line, a ground line, a clock source line and a data line. The EMV card may have at least one processor that is powered by the power and ground lines, and that performs various functions in conjunction with the payment terminal, such as encryption and communication of card and transaction information, for example via an authorization request cryptogram (ARQC) and other transaction information.

Figure 2:
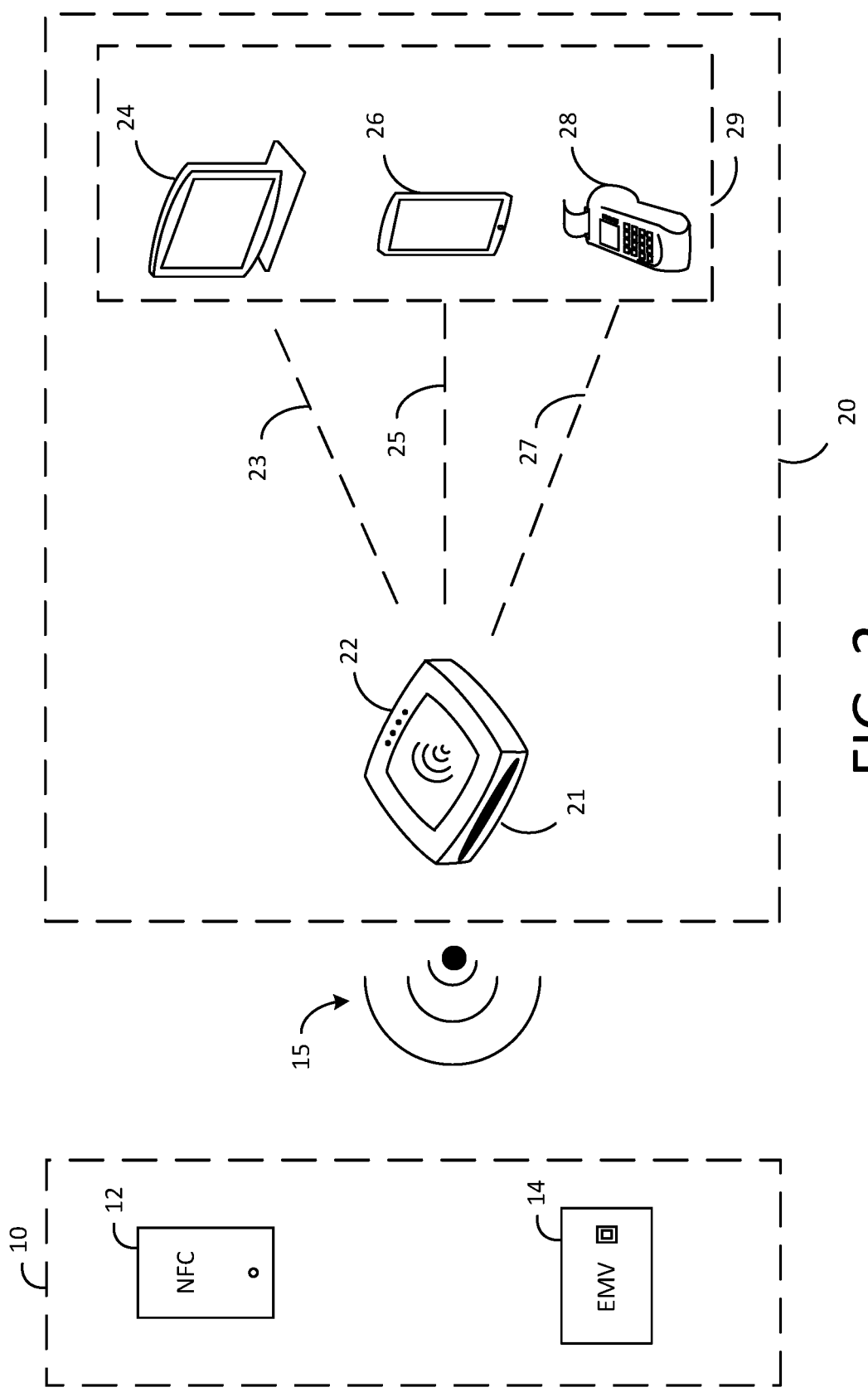
FIG. 2 depicts an illustrative block diagram of a payment device and payment terminal in accordance with some embodiments of the present disclosure.

FIG. 2 depicts an illustrative block diagram of payment device 10 and payment terminal 20 in accordance with some embodiments of the present disclosure. Although it will be understood that payment device 10 and payment terminal 20 of payment system 1 may be implemented in any suitable manner, in one embodiment the payment terminal 20 may comprise a payment reader 22 and a merchant device 29 (either or which may be an NFC device as will be described in more detail below). However, it will be understood that as used herein, the term payment terminal may refer to any suitable component of the payment terminal, such as payment reader 22. In an embodiment, the payment reader 22 of payment terminal 20 may be a device that facilitates transactions between the payment device 10 and a merchant device 29 running a point-of-sale application.

In one embodiment, payment device 10 may be a device that is capable of communicating with payment terminal 20 (e.g., via payment reader 22), such as an NFC device 12 or an EMV chip card 14 (which also may be an NFC device capable of communicating with the payment reader 22 via NFC). Chip card 14 may include a secure integrated circuit that is capable of communicating with a payment terminal such as payment terminal 20, generating encrypted payment information, and providing the encrypted payment information as well as other payment or transaction information (e.g., transaction limits for payments that are processed locally) in accordance with one or more electronic payment standards such as those promulgated by EMVCo. In some embodiments, chip card 14 may include an EMV chip that is an externally-driven processing device that receives signals necessary to operate the EMV chip (e.g., power, ground, and clock signals) from an external source. Chip card 14 may include contact pins for communicating with payment reader 22 (e.g., in accordance with ISO 7816) and in some embodiments, may be inductively coupled to payment reader 22 via a near field 15. A chip card 14 that is inductively coupled to payment reader 22 may communicate with payment reader 22 using load modulation of a wireless carrier signal that is provided by payment reader 22 in accordance with a wireless communication standard such as ISO 14443.

NFC device 12 may be an electronic device such as a smart phone, tablet, or smart watch that is capable of engaging in secure transactions with payment terminal 20 (e.g., via communications with payment reader 22). NFC device 12 may have hardware (e.g., a secure element including hardware and executable code) and/or software (e.g., executable code operating on at least one processor in accordance with a host card emulation routine) for performing secure transaction functions. During a payment transaction, NFC device 12 may be inductively coupled to payment reader 22 via near field 15 and may communicate with payment terminal 20 by active or passive load modulation of a wireless carrier signal provided by payment reader 22 in accordance with one or more wireless communication standards such as ISO 14443 and ISO 18092.

Although payment terminal 20 may be implemented in any suitable manner, in one embodiment payment terminal 20 may include a payment reader 22 and a merchant device 29. The merchant device 29 runs a point-of-sale application that provides a user interface for the merchant and facilitates communication with the payment reader 22 and the payment server 40. Payment reader 22 may facilitate communications between payment device 10 and merchant device 29. As described herein, a payment device 10 such as NFC device 12 or chip card 14 may communicate with payment reader 22 via inductive coupling. This is depicted in FIG. 2 as near field 15, which comprises a wireless carrier signal having a suitable frequency (e.g., 13.56 MHz) emitted from payment reader 22.

In one embodiment, payment device 10 may be a contactless payment device such as NFC device 12 or chip card 14, and payment reader 22 and the contactless payment device 10 may communicate by modulating the wireless carrier signal within near field 15. In order to communicate information to payment device 10, payment reader 22 changes the amplitude and/or phase of the wireless carrier signal based on data to be transmitted from payment reader 22, resulting in a wireless data signal that is transmitted to the payment device. This signal is transmitted by an antenna of payment reader 22 that is tuned to transmit at 13.56 MHz, and if the payment device 10 also has a suitably tuned antenna within the range of the near field 15 (e.g., 0 to 10 cm), the payment device receives the wireless carrier signal or wireless data signal that is transmitted by payment reader 22. In the case of a wireless data signal, processing circuitry of the payment device 10 is able to demodulate the received signal and process the data that is received from payment reader 22.

When a contactless payment device such as payment device 10 is within the range of the near field 15, it is inductively coupled to the payment reader 22. Thus, the payment device 10 is also capable of modulating the wireless carrier signal via active or passive load modulation. By changing the tuning characteristics of the antenna of payment device 10 (e.g. by selectively switching a parallel load into the antenna circuit based on modulated data to be transmitted) the wireless carrier signal is modified at both the payment device 10 and payment reader 22, resulting in a modulated wireless carrier signal. In this manner, the payment device is capable of sending modulated data to payment reader 22.

In some embodiments, payment reader 22 also includes an EMV slot 21 that is capable of receiving chip card 14. Chip card 14 may have contacts that engage with corresponding contacts of payment reader 22 when chip card 14 is inserted into EMV slot 21. Payment reader 22 provides power and a clock signal to an EMV chip of chip card 14 through these contacts and payment reader 22 and chip card 14 communicate through a communication path established by the contacts.

Payment reader 22 may also include hardware for interfacing with a magnetic strip card (not depicted in FIG. 2). In some embodiments, the hardware may include a slot that guides a customer to swipe or dip the magnetized strip of the magnetic strip card such that a magnetic strip reader can receive payment information from the magnetic strip card. The received payment information is then processed by the payment reader 22.

Merchant device 29 may be any suitable device such as tablet payment device 24, mobile payment device 26, or payment terminal 28. In the case of a computing device such as tablet payment device 24 or mobile payment device 26, a point-of-sale application may provide for the entry of purchase and payment information, interaction with a customer, and communications with a payment server 40. For example, a payment application may provide a menu of services that a merchant is able to select and a series of menus or screens for automating a transaction. A payment application may also facilitate the entry of customer authentication information such as signatures, PIN numbers, or biometric information. Similar functionality may also be provided on a dedicated payment terminal 28.

Merchant device 29 may be in communication with payment reader 22 via a communication path 23/25/27. Although communication path 23/25/27 may be implemented via a wired (e.g., Ethernet, USB, FireWire, Lightning) or wireless (e.g., Wi-Fi, Bluetooth, NFC, or ZigBee) connection, in one embodiment payment reader 22 may communicate with the merchant device 29 via a Bluetooth low energy interface. In some embodiments, processing of the payment transaction may occur locally on payment reader 22 and merchant device 29, for example, when a transaction amount is small or there is no connectivity to the payment server 40. In other embodiments, merchant device 29 or payment reader 22 may communicate with payment server 40 via a public or dedicated communication network 30. Although communication network 30 may be any suitable communication network, in one embodiment communication network 30 may be the Internet and payment and transaction information may be communicated between payment terminal 20 and payment server 40 in an encrypted format such by a transport layer security (TLS) or secure sockets layer (SSL) protocol.

Figure 3:
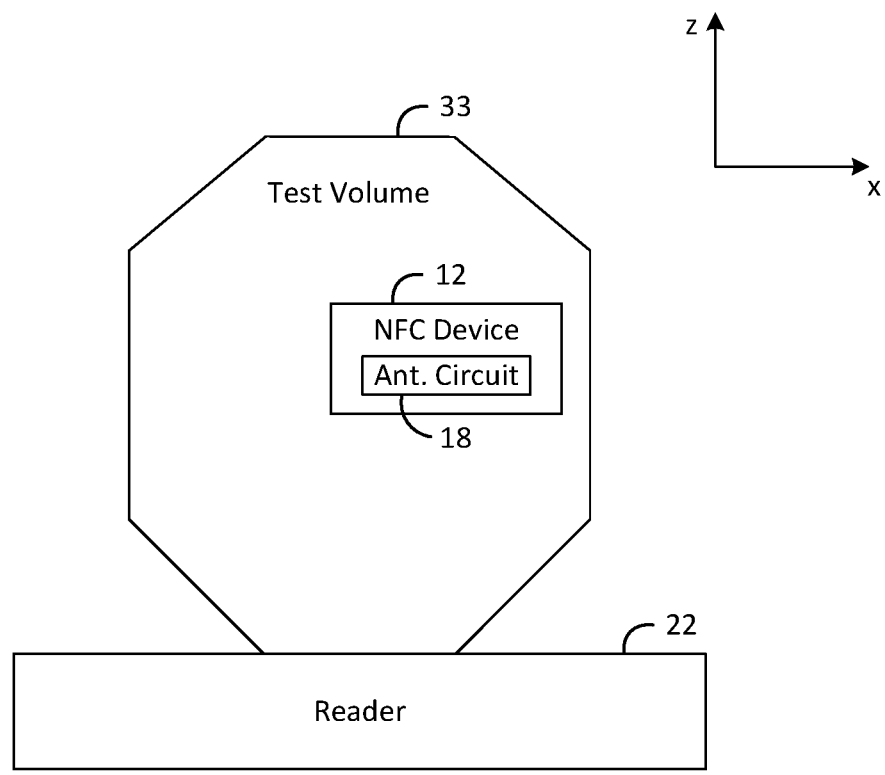
FIG. 3 depicts an illustrative payment reader and NFC device in accordance with some embodiments of the present disclosure.

FIG. 3 depicts an exemplary payment reader 22. The reader 22 may be configured to transmit wireless NFC signals to an NFC device 12 within close proximity to the reader 22. As an example, when the reader 22 is sufficiently close to an NFC device 12 such that an antenna circuit 18 of the reader 22 is inductively coupled to an antenna of the NFC device 12, the reader 22 may transmit to the NFC device 12 a wireless carrier signal that is load modulated by the NFC device 12 in order to transmit payment information for use in processing a payment transaction. The NFC device 12 may be referred to as "remote" from the reader in that it is not physically connected to the reader and uses wireless signals to communicate.

Applicable NFC standards may require the wireless signal transmitted by the reader 22 to exhibit an amplitude above a predefined threshold at each point within a test volume 33. In some embodiments, the test volume 33 may extend about 4 cm from the reader 22 and may be about 5 cm wide, but other dimensions of the test volume 33 are possible. By adhering to the applicable NFC standards, the NFC device 12 should be able to communicate with the reader 22 with a certain minimum signal quality regardless of its location within the test volume 33. In the context of a payment system, the NFC device 12 may be a payment device, such as a credit card or a mobile telephone storing a payment application, but other types of NFC devices 12 are possible. In some embodiments, the NFC device 12 may be a test probe that is used to confirm whether the reader 22 is in compliance with applicable NFC standards (e.g., to certify the reader 22).

Figure 4:
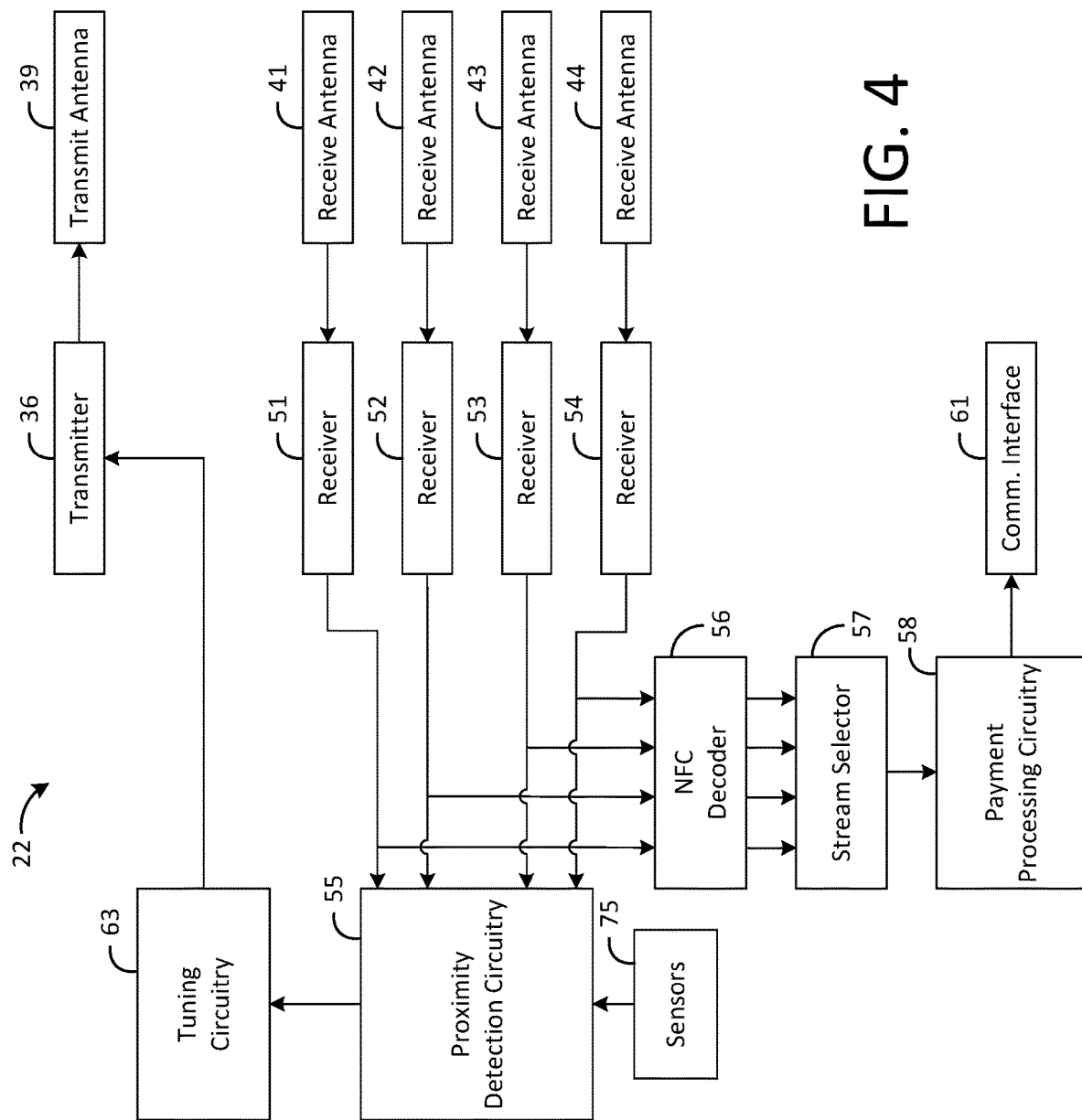
FIG. 4 depicts an illustrative block diagram of a payment reader in accordance with some embodiments of the present disclosure.

FIG. 4 is a block diagram illustrating an exemplary embodiment of the reader 22. The exemplary embodiment shown by FIG. 4 has a transmitter 36 that is coupled to an antenna 39, referred to hereafter for ease of illustration as "transmit antenna 39." The transmitter 36 is configured to transmit a wireless carrier signal from the transmit antenna 39. As described above, an NFC device 12 (FIG. 3) within the test volume 33 (FIG. 3) may be configured to receive and modulate the wireless carrier signal in order to communicate information to the reader 22. As shown by FIG. 4, the reader 22 has at least one antenna, referred to hereafter for ease of illustration as "receive antenna," for receiving the modulated signal from the NFC device 12. In the exemplary embodiment shown by FIG. 4, there are four receive antennas 41-44, but there may be any number of receive antennas in other embodiments.

Each receive antenna 41-44 is coupled to a respective receiver 51-54, as shown by FIG. 4, that receives and processes (e.g., filters and amplifies) the analog signal received from its corresponding antenna 41-44. Each of the analog signals processed by the receivers 51-54 is received by an NFC decoder 56, which is configured to demodulate the signal received by the antenna in order to recover and decode data transmitted by the NFC device 12. That is, the NFC decoder 56 converts each analog signal from the receivers 51-54 into a respective digital data stream defining information from the NFC device 12. A stream selector 57 may be configured to select one of the data streams for forwarding to other components of the reader 22 for further processing. As an example, the NFC device 12 may communicate payment information to be used for completing a payment transaction. In such an embodiment, the stream selector 57 may select one of the streams from a respective one of the receivers 51-54 for forwarding to payment processing circuitry 58. Such data stream defines the payment processing information from the NFC device 12 and is used by the payment processing circuitry 58 in processing a payment transaction. In this regard, the payment processing circuitry 58 may be coupled to a communication interface 61, such as a cellular radio, that is configured to wirelessly transmit payment information processed by the circuitry 58 to a payment server (not shown in FIG. 4) for approval of the payment transaction.

Each receiver 51-54 is also configured to provide the processed analog signal to proximity detection circuitry 55 that then further processes the signal in order to detect a proximity of the NFC device 12 relative to the reader 22, as will be described in more detail below. The proximity detection circuitry 55 may include one or more processors, field-programmable gate arrays (FPGAs), or other types of circuitry for performing the functions ascribed to such circuitry 55 herein.

The proximity detection circuitry 55 is configured to transmit to tuning circuitry 63 location data indicating the location of the payment device 12 relative to the reader 22. The tuning circuitry 63 is configured to tune communication characteristics of the transmitter 36 based on the location of the NFC device 12 relative to the reader 22. Specifically, the tuning circuitry 63 tunes the communication characteristics such that the received power of the wireless carrier signal at the location of the NFC device 12 is higher, thereby helping to ensure that applicable NFC standards are satisfied. As an example, the transmitter 36 may include variable capacitors and resistors that can be controlled by the tuning circuitry 63 in order to change the transmission profile of the wireless carrier signal, thereby changing the power of the carrier signal at various points within the test volume 33. In addition, the tuning circuitry 63 may change the transmit power based on location, such as increasing transmit power when it is determined that the NFC device 12 is being moved to a dead zone or decreasing transmit power when it is determined that the NFC device 12 is being moved away from a dead zone. By optimizing the communication characteristics for the detected location of the NFC device 12, it is possible for the reader 22 to use a lower transmit power while still ensuring that the receive power at the NFC device 12 is above a threshold specified by applicable NFC standards for the test volume 33. That is, the communication characteristics may be tuned to ensure that the reader 22 remains compliant with the applicable specifications pertaining to receive power as the NFC device 12 is moved within the test volume 33.

Note that there are various techniques that may be used to detect the location of the NFC device 12 and, specifically for example, the distance of the NFC device 12 from any of the receive antennas 41-44. In one exemplary embodiment, the distance of the NFC device 12 from one or more receive antennas 41-44 is precisely determined based on the resonant frequency of the antenna circuit 18 within the NFC device 12.

Figure 5:
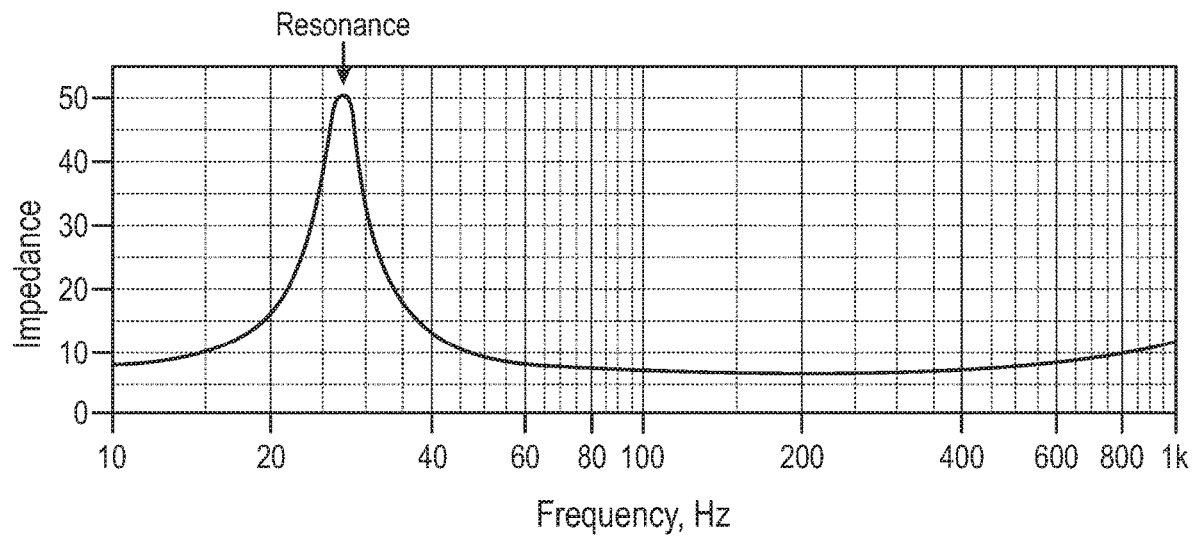
FIG. 5 depicts an illustrative graph of impedance versus frequency for an antenna circuit of an NFC device in accordance with some embodiments of the present disclosure.

In this regard, the resonant frequency of the antenna circuit 18 of the NFC device 12 is the point where its impedance appears to be infinitely large or at open circuit. At other frequencies, the impedance of the antenna circuit 18 appears to be low. FIG. 5 depicts an exemplary graph of impedance versus frequency for an antenna circuit 18 where resonant frequency is indicated by the peak of the curve. This high impedance at resonant frequency results in a substantial decrease in voltage for the signals received by the receive antennas 41-44 of the reader 22 due to the inductive coupling between the antennas of the reader 22 and the NFC device 12. Further, the amount of the decrease is a function of distance. Specifically, the magnitude of the voltage drop increases as the NFC device 12 moves closer to the receive antennas 41-44 of the reader 22. To detect a distance of the NFC device 12 from a receive antenna 41-44, the reader 22 is configured to identify the resonant frequency of the antenna circuit 18 for the NFC device 12 and further to detect a change in voltage of the signal received by the receive antenna 41-44 resulting from the high impedance at the resonant frequency.

Figure 6:
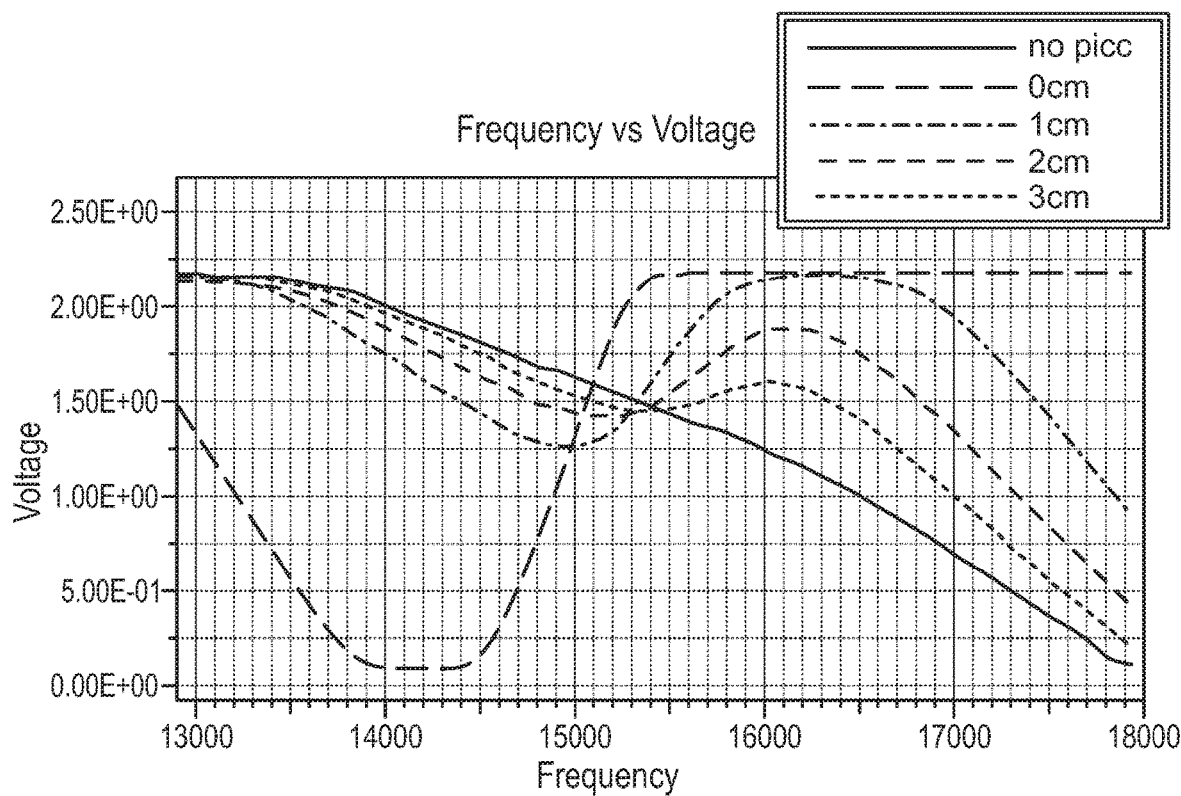
FIG. 6 depicts an illustrative graph of voltage versus frequency for signals received from an NFC device at multiple distances in accordance with some embodiments of the present disclosure.

In one exemplary embodiment, in order to detect a distance of the NFC device 12 from a receive antenna 41, the transmitter 36 is configured to transmit a continuous sine signal across a wide frequency band that includes the expected resonant frequency of the antenna circuit 18 for the NFC device 12. The proximity detection circuitry 55 is configured to measure the voltage of the signal received by the antenna 41 from the NFC device 12 across the transmitted frequency band. As noted above, there will be a noticeable voltage drop at the resonant frequency of the antenna circuit 18 for the NFC device 12. FIG. 6 is a graph showing voltage versus frequencies measured by the proximity detection circuitry 55 when the NFC device is at different distances from the receive antenna 41. Each curve of FIG. 6 indicates the spectrum of the signal received by the antenna 41 when the NFC device 12 is located at a different distance from the antenna 41.

Based on the measured spectrum of the signal received by the antenna 41, the proximity detection circuitry 55 identifies the NFC device's resonant frequency within the spectrum, which is at the peak of the voltage drop that results from the increased impedance of the antenna circuit 18 for the NFC device 12. The proximity detection circuitry 55 determines the magnitude of the voltage drop at resonant frequency from the curve's normal profile for other frequencies and estimates the NFC device's distance from the antenna 41 based on the voltage drop. Such estimation can be more precise relative to other techniques that may be used to estimate distance. However, in other embodiments, it is possible to use other techniques to estimate distance.

In some embodiments, such as the embodiment shown by FIG. 4, multiple receive antennas 41-44 may be used, and information from each of the multiple antennas 41-44 may be processed by the proximity detection circuitry 55 to precisely determine the NFC device's location in three-dimensional (3D) space. As an example, the proximity detection circuitry 55 may determine the x-coordinate, y-coordinate, and z-coordinate of the NFC device 12 in a coordinate system that is relative to the reader 22.

Figure 7:
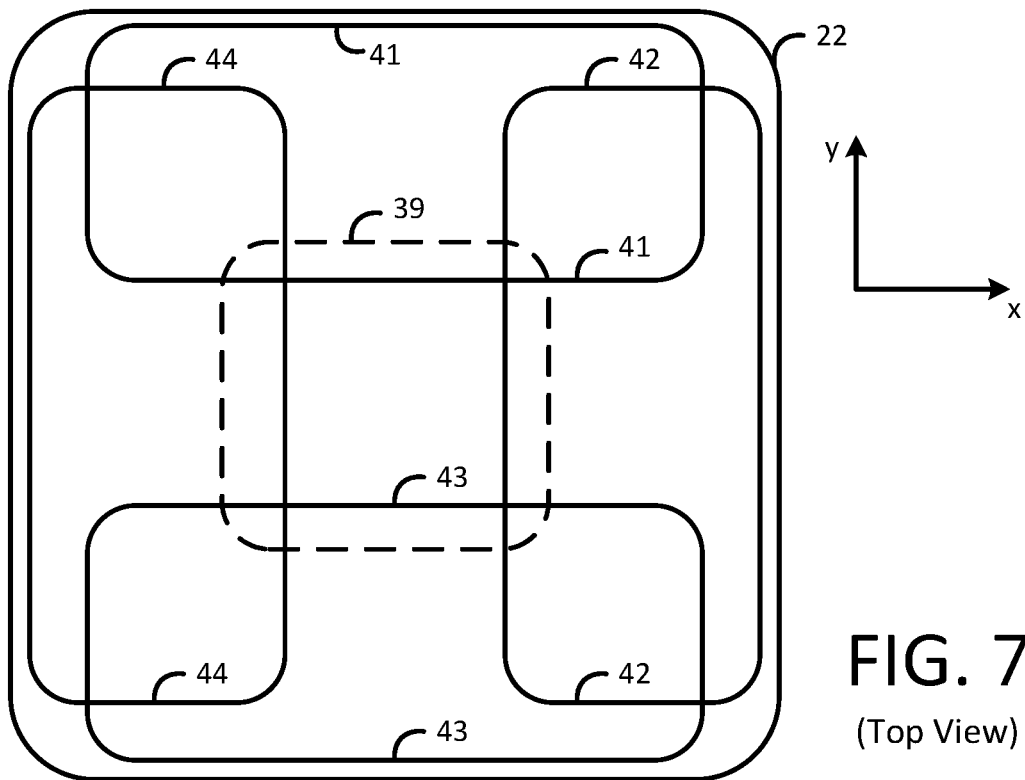
FIG. 7 depicts a top view of an illustrative payment reader in accordance with some embodiments of the present disclosure.

In this regard, each receive antenna 41-44 may be at a different location on the reader 22 in order to facilitate the process of determining the location of the NFC device 12. FIG. 7 depicts an exemplary embodiment of the reader 22 for which the receive antennas 41-44 are arranged to completely surround the transmit antenna 39 in the x-direction and the y-direction. In this regard, antennas 41 and 43 are located on opposite sides of the transmit antenna 39, and antennas 42 and 44 are located on opposite sides of the transmit antenna 39. As shown by FIG. 7, it is possible for the receive antennas 41-44 to overlap each other, as well as the transmit antenna 39. In some embodiments, the antennas may overlap in two dimensions (e.g., the x-direction and the y-direction, as shown by FIG. 7) with at least some of the antennas being in a different plane (e.g., the plane in the x-direction and y-direction). Indeed, as will be described in more detail below, the transmit antenna 39 may be at a different z-coordinate than any of the receive antennas 41-44. In other embodiments, other patterns and arrangements of the transmit antenna 39 and receive antennas 41-44 are possible. Note that for simplicity of illustration, FIG. 7 shows antennas having a single turn, but each of the antennas may be a conventional NFC antenna having many turns.

The proximity detection circuitry 55 may be configured to determine the distance of the NFC device 12 from each receive antenna 41-44 using the distance estimation techniques described above. After determining the respective distances of the NFC device 12 from the receive antennas 41-44, the proximity detection circuitry 55 may use triangulation, trilateration, or other techniques for determining the coordinates of the NFC device 12 in 3D space relative to the reader 22. Such coordinates precisely indicate the location of the NFC device 12 within the test volume 33, and the tuning circuitry 63 may use such coordinates to tune the communication characteristics of the transmitter 36, as described above.

Note that the techniques for determining the location of the NFC device 12 may be simplified by assuming that the NFC 12 is within or close to the test volume 33. For example, using such assumption in combination with conventional triangulation or trilateration techniques, it may be possible to determine the precise location of the NFC device 12 within the test volume 33 using just two receive antennas.

In some embodiments, the reader 22 may combine information from one or more receive antennas 41-44 with information from other sources in order to determine the location of the NFC device 12 in 3D space. As an example, the reader 22 may include one or more sensors 75, as shown by FIG. 4, that are configured to detect information that may be used to determine one or more coordinates of the NFC device 12. In one embodiment, the proximity detection circuitry 55 is configured to use information from the sensors 75 to determine the x-coordinate and y-coordinate of the NFC device 12 in a horizontal plane. In such an embodiment, the proximity detection circuitry 55 may use the distance determined from the signal received by one of the antennas 41-44 in order to determine the z-coordinate or depth of the NFC device 12 in the z-direction, which is perpendicular to the horizontal plane. Thus, a single receive antenna may be used in conjunction with the sensors 75 to determine the precise location of the NFC device relative to the reader 22 in 3D space.

Note that there are various types of sensors 75 that may be used to determine one or more coordinates, such as the x-coordinate and y-coordinate, of the NFC device 12. As an example, it is possible for the sensors 75 to include one or more proximity sensors that measure distance or sense objects within a certain range. Such sensors may detect objects by transmitting a signal and measuring an amount of the signal that reflects from objects and returns to the sensor. As an example, an optical sensor may be used to transmit an optical signal, or a sonar sensor may be used to transmit an acoustic signal. In other embodiments, other types of sensors, such as capacitive sensors, may be used to sense a presence of the NFC device 12 or a distance of the NFC device from the respective sensor.

Figure 8:
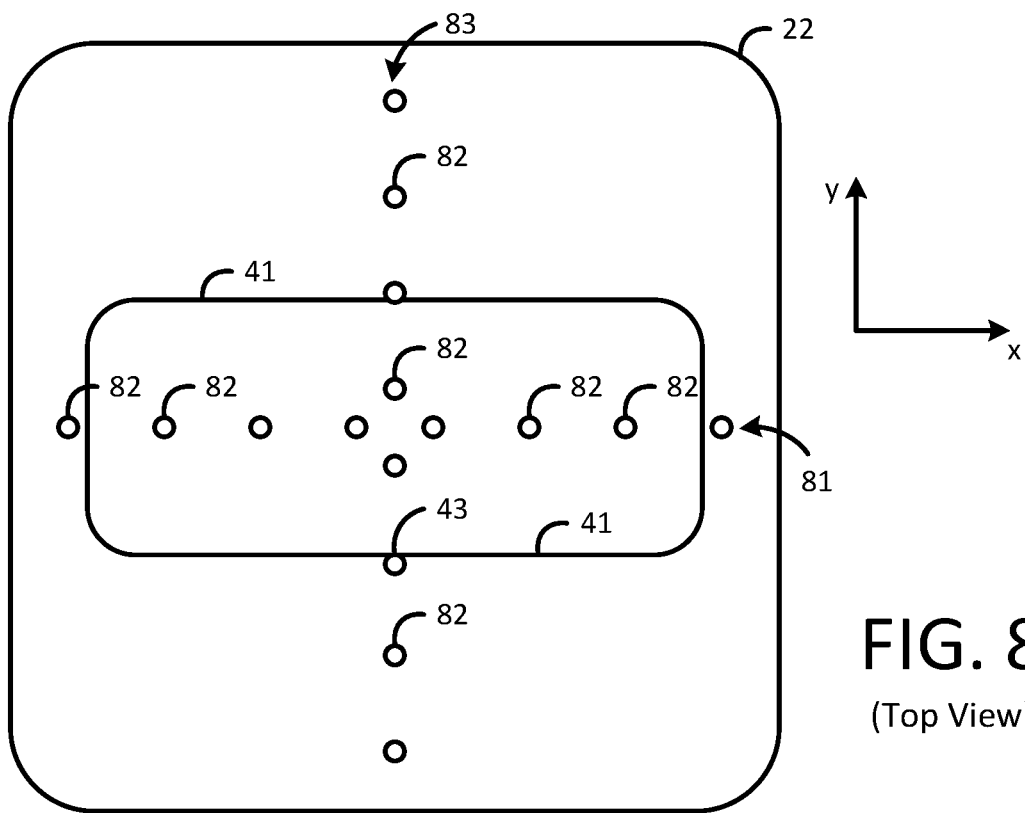
FIG. 8 depicts a top view of an illustrative payment reader in accordance with some embodiments of the present disclosure.

FIG. 8 shows an exemplary embodiment having a single receive antenna 41 used in conjunction with a horizontal row 81 of proximity sensors 82 for sensing the location of the NFC device 12 in the x-direction and a vertical row 83 of proximity sensors 82 for sensing the location of the NFC device 12 in the y-direction. In such an embodiment, each sensor 82 may sense when the NFC device 12 is directly above the sensor 82. Thus, the proximity detection circuitry 55 may determine the x-coordinate of the NFC device 12 by determining which of the sensors 82 of row 81 are sensing a presence of the NFC device 12, and the proximity detection circuitry 55 may determine the y-coordinate of the NFC device 12 by determining which of the sensors 82 of row 83 are sensing a presence of the NFC device 12. In other embodiments, other types of sensors 75 and techniques may be used to determine the coordinates of the NFC device 12.

Figure 9:
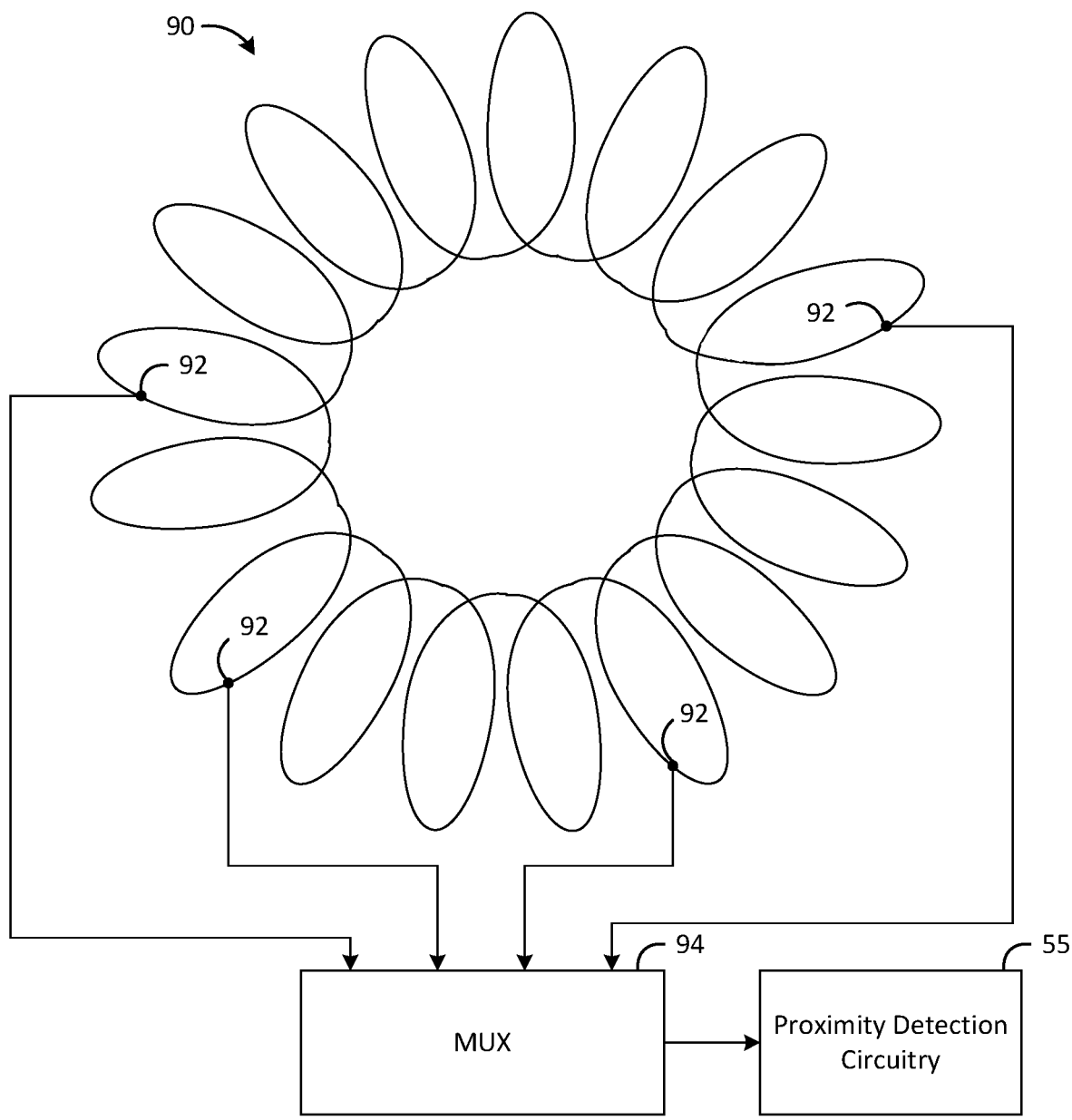
FIG. 9 depicts an illustrative antenna for a payment reader in accordance with some embodiments of the present disclosure.

FIG. 9 depicts an exemplary looped antenna 90 having multiple pins 92 that are electrically coupled to the proximity detection circuitry 55. In the exemplary embodiment shown by FIG. 9, the proximity detection circuitry 55 is coupled to the pins 92 through a multiplexer (MUX) 94 so that the proximity detection circuitry 55 receives signals from different pins serially rather than in parallel, but the use of multiplexer 94 is unnecessary in other embodiments.

For each pin 92, the proximity detection circuitry 55 is configured to measure the spectrum of the signal received from the pin 92 and to then estimate the distance of the NFC device 12 from the pin 92 using the same techniques described above for the receive antennas 41-44. Note that the antenna 90 may have any number of pins 92 so that the proximity detection circuitry 55 may have any number of data points for determining the location of the NFC device 12.

An exemplary operation and use of the system 1 will be described below with reference to FIG. 10.

In this regard, assume that the reader 22 is currently communicating with an NFC 12 device that is within the test volume 33. In this regard, the communication characteristics of the transmitter 36 are such that the NFC device 12 receives a sufficient amount of power from the wireless carrier signal transmitted by the reader 22. That is, the amount of power received by the NFC device 12 exceeds a predefined threshold so that the reader 22 is in compliance with applicable NFC standards. However, assume that the signal profile of the wireless carrier signal is such that there is a dead zone within the test volume 33 at or near a boundary of the test volume 33. In this regard, if the NFC device 12 is moved to the dead zone without changing the communication characteristics of the transmitter 36, then the amount of power received by the NFC device 12 would fall below the predefined threshold so that the reader 22 is no longer compliant with NFC standards. For illustrative purposes, assume that the NFC device 12 is moved into this dead zone.

When the NFC 12 is moved into the dead zone, the reader 22 detects the change in location of the NFC device 12 and then adjusts the communication characteristics of the transmitter 36 so that the NFC device 12 receives a suitable amount of power from the reader 22 in accordance with applicable NFC standards. In this regard, for at least one receive antenna 41-44, the proximity detection circuitry 55 of the reader 22 measures the spectrum of the signal received by such antenna 41-44 across a range of frequencies, as shown by block 101 of FIG. 10. Based on this measured spectrum, the proximity detection circuitry 55 identifies the resonant frequency of the antenna circuit 18 for the NFC device 12, as shown by block 103. As described above, such resonant frequency is at the peak of the voltage drop resulting from the increased impedance of the NFC device's antenna circuit 18.

As shown by block 106 and 109, the proximity detection circuitry 55 of the reader 22 determines the amplitude of the received signal at resonant frequency and determines a distance of the NFC device 12 from the receive antenna based on this amplitude. As an example, the proximity detection circuitry 55 may determine a voltage drop of the signal at the resonant frequency and convert this voltage drop into a distance estimate. Specifically, the reader 22 may include one or more tables that can be used by the proximity detection circuitry 55 to look up or otherwise find the distance of the NFC device 12 from the reader using amplitude or voltage drop at the resonant frequency as a lookup key. In other embodiments, the proximity detection circuitry 55 may calculate the distance using a predefined formula that is based on the measured amplitude or voltage drop.

As shown by block 112, the proximity detection circuitry 55 determines the precise location of the NFC device 12 relative to the reader 22 using at least the distance determined in block 109. As an example, the proximity detection circuitry 55 may perform blocks 101, 103, 106, and 109 for multiple receive antennas and then use the estimated distances to calculate the coordinates of the NFC device 12 in 3D space. In another example, the proximity detection circuitry 55 may use parameters sensed by sensors 75 to determine the x-coordinate and y-coordinate of the NFC device 12 and to use the distance estimated in block 109 to determine the NFC device's z-coordinate. In other examples, other techniques may be used to determine the location of the NFC device 12 in 3D space based on the distance estimated in block 109.

Figure 10:
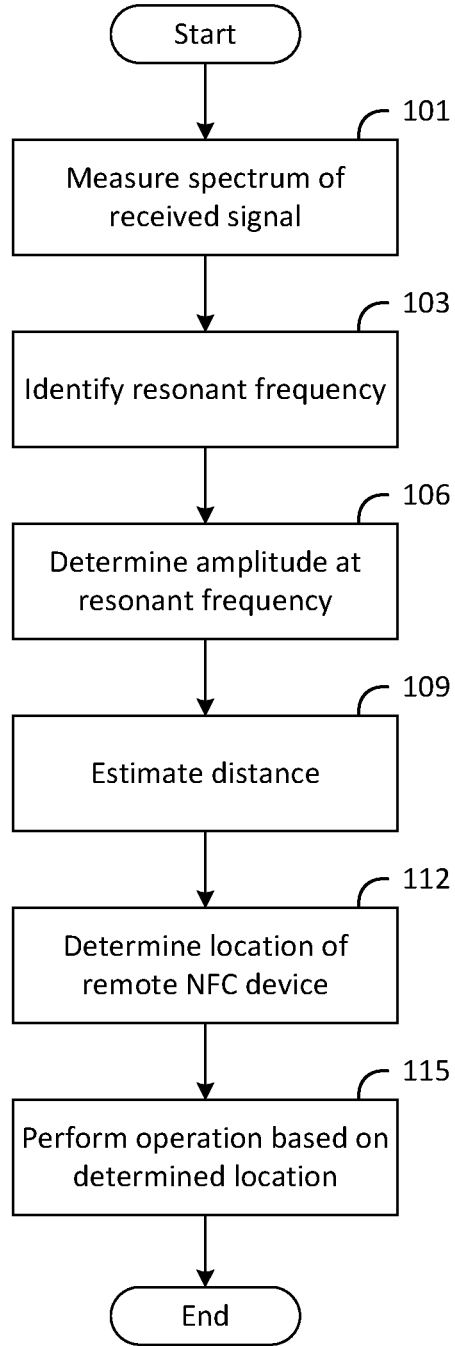
FIG. 10 depicts a flow chart illustrating an exemplary process of determining a location of an NFC in accordance with some embodiments of the present disclosure.

Based on the location of the NFC device 12 determined in block 112, the reader 22 is configured to perform at least one operation for enhancing the efficiency or operation of the reader 22, as shown by block 115 of FIG. 10. As an example, the tuning circuitry 63 may change the communication characteristics of the transmitter 36. In the instant example where the NFC device 12 has been moved to a dead zone, the tuning circuitry 63 tunes the communication characteristics of the transmitter 36 so that the NFC device 12 receives a greater amount of power from the reader 22. Specifically, the receive power is increased by the tuning in the dead zone so that the NFC device 12 receives a sufficient amount of power for the reader 22 to remain compliant with applicable NFC standards. Thus, the reader 22 may operate at a relatively low power level that results in dead zones within the test volume 33 but nevertheless remain compliant with applicable NFC standards by adjusting the communication characteristics of the transmitter 36 as the NFC device 12 is moved to different locations in the test volume 33.

Figure 11:
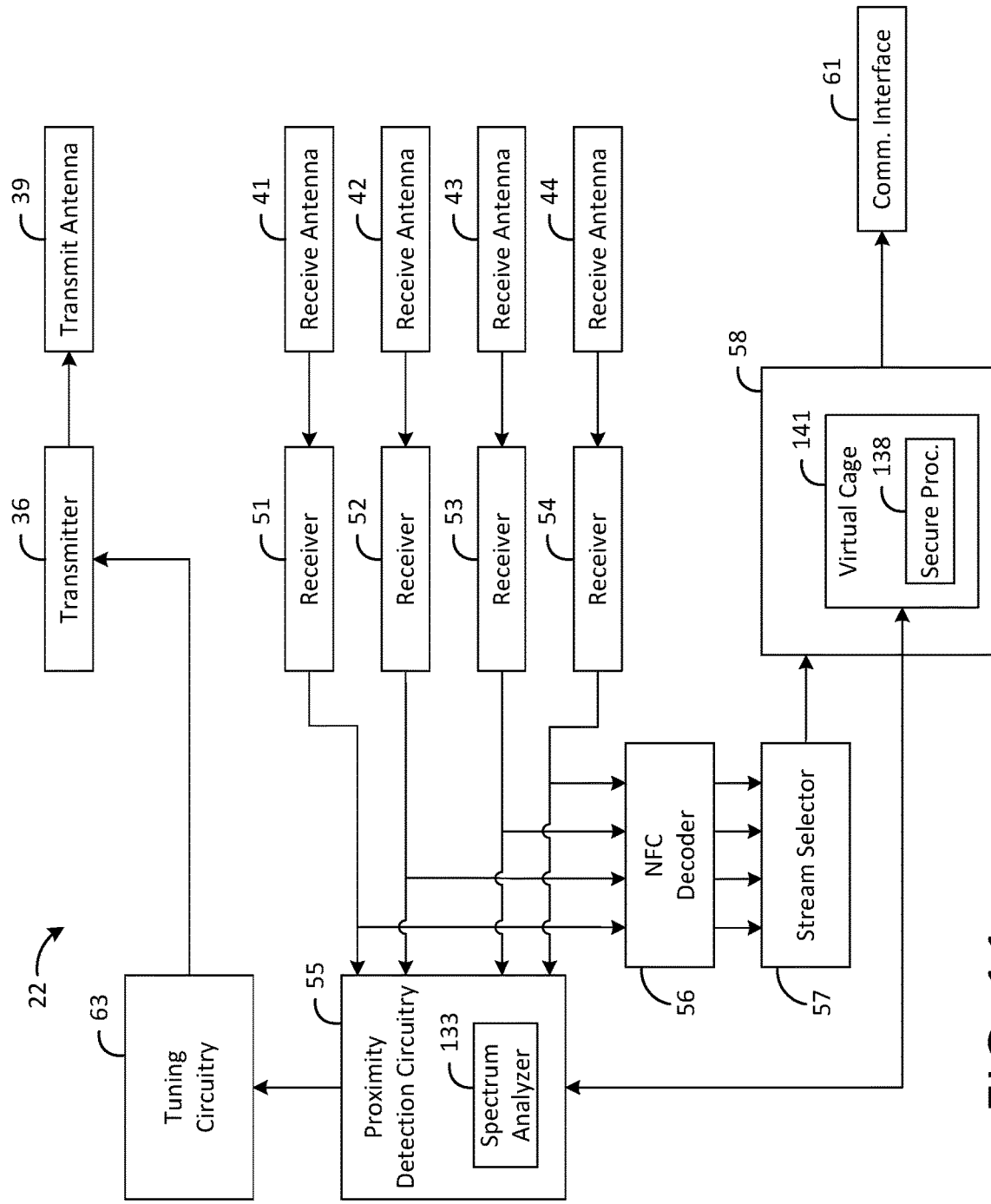
FIG. 11 depicts an illustrative block diagram of a payment reader in accordance with some embodiments of the present disclosure.

It should be emphasized that the above configurations and processes are exemplary, and various modifications may be made to the aforementioned embodiments. As an example, it is possible for components of the proximity detection circuitry 55 used to analyze the spectra of signals received by the antennas 41-44 to also be used for measuring the spectra of other signals within the reader 22, as may be desired. In this regard, as shown by FIG. 11, the proximity detection circuitry 55 may include a spectrum analyzer 133 for measuring the spectra of signals, such as the signals received by the antennas 41-44. Depending on its design, the spectrum analyzer 133 has certain electrical components for measuring spectra. As an example, the spectrum analyzer 133 may have a narrowband filter with an adjustable center frequency that can be swept through a range of frequencies so that a voltage sensor can measure the voltage of the received signal at multiple frequencies. In another embodiment, the spectrum analyzer 133 may have a Fourier transform device that transforms the received signal from the time domain to the frequency domain to allow an analysis of the signal in the frequency domain. The spectrum analyzer 133 may also have a signal generator that varies a frequency of its output so that it can sweep across a range of frequencies. These same components, such as filters, voltage sensors, Fourier transform devices, signal generators, and other devices that may be used to measure a spectrum of a signal from at least one of the receive antennas 41-44 may also be used to measure the spectrum of at least one other signal in the reader 22.

As an example, the payment processing circuitry 58 may define a secure area for processing sensitive information such as personal identification numbers (PINs) used in payment transactions. As shown by FIG. 11, one or more components, such as a secure processor 138 for processing sensitive information of a payment transaction, may be located in the secure area, which is protected from tampering attempts by a virtual cage 141. As known in the art, the virtual cage 141 may comprise a plurality of conductive traces that pass over the components within the virtual cage 141 such that a hacker would need to touch or modify (e.g., cut) at least one of the conductive traces in order to physically access the components in the secure area.

The spectrum analyzer 133 of the proximity detection circuitry 55 may be electrically coupled to the traces of the virtual cage 141 and transmit a probe signal through the traces of the virtual cage 141. The spectrum analyzer 133 may also analyze the response (i.e., the probe signal after passing through the virtual cage) to determine the spectrum of the received signal. In particular, the same components of the spectrum analyzer 133 used to measure the spectrum of a signal from at least one receive antenna 41-44, such as the filter, voltage sensor, or Fourier transform device described above, may also be used to measure the spectrum of the signal received from the virtual cage 141. If the measured spectrum from the virtual cage 141 materially changes (e.g., the voltage at one or more frequencies changes by at least a threshold amount), the proximity detection circuitry 133 may be configured to detect a tamper attempt. In response to such detection of a tamper event, the proximity circuitry 133 may take one or more actions, such as transmitting a warning message or disabling one or more components or functions of the reader 22. Moreover, using the same components of the spectrum analyzer 133 to measure spectra of different signals within the reader 22 helps to reduce the circuitry within and the overall cost of the reader 22.

In some embodiments, the proximity detection circuitry 55 may be configured to detect a problem with the NFC device 12 based on the spectrum of the signal received from it. In this regard, certain types of NFC devices 12 are expected to have resonant frequencies within a certain frequency range. As an example, a design of an NFC device 12 from a first issuing bank may be expected to have a resonant frequency in one range, and an NFC device 12 from another issuing bank may be expected to have a resonant frequency in another range. In the context of test probes, there may be multiple types of test probes that could be used to certify the reader 22. The proximity detection circuitry 55 may include memory for storing predefined data indicating the expected resonant frequency range for the NFC device 12. If there are multiple types of NFC devices 12 with different frequency ranges, the proximity detection circuitry 55 may store the expected resonant frequency range for each device type.

When the proximity detection circuitry 55 identifies the resonant frequency for the antenna circuit 18 of the NFC device 12, it is configured to compare the measured resonant frequency to the expected resonant frequency for the NFC device 12 stored in memory. If the measured resonant frequency is outside of this range, the proximity detection circuitry 55 may be configured to detect a problem with the NFC device and report the problem to a user. As an example, the resonant frequency of the NFC device 12 may be outside of the expected range when the antenna circuit 18 has been damaged, which may impair the device's ability to reliably communicate with the reader 22. In such case, the proximity detection circuitry 55 may be configured to transmit a warning message from the reader 22 using the communication interface 61 or otherwise to a server or other location so that corrective action may be taken. As an example, the reader 22 may transmit the warning message to the payment server to be used for approving the payment transaction so that the issuing bank may take corrective action, such as issuing a new NFC device 12 to the consumer making the purchase. In other embodiments, other types of corrective actions may be taken.

The reader 22 may also be configured to tailor its communication characteristics based on the determined device type for the NFC device 12. In this regard, the tuning circuitry 63 may adjust the communication characteristics of the transmitter 36 based on the device type determined by the proximity detection circuitry 55. In some cases, the tuning circuitry 63 may tune the communication characteristics based on both device type and the location of the NFC device 12. In some embodiments, device type may be determined based on data communicated from the NFC device 12, such as an account number or other payment information, to be used in a payment transaction. In other embodiments, device type may be determined based on the characteristics of a signal received from the NFC device 12. As an example, the proximity detection circuitry 55 may identify device type based on the device's resonant frequency, as determined by the circuitry 55 according to the techniques described above. Other physical characteristics indicated by the spectrum of the received signal, such as the amplitude of impedance loading may also be used to identify device type. In other embodiments, other techniques for determining device type are possible.

Figure 12:
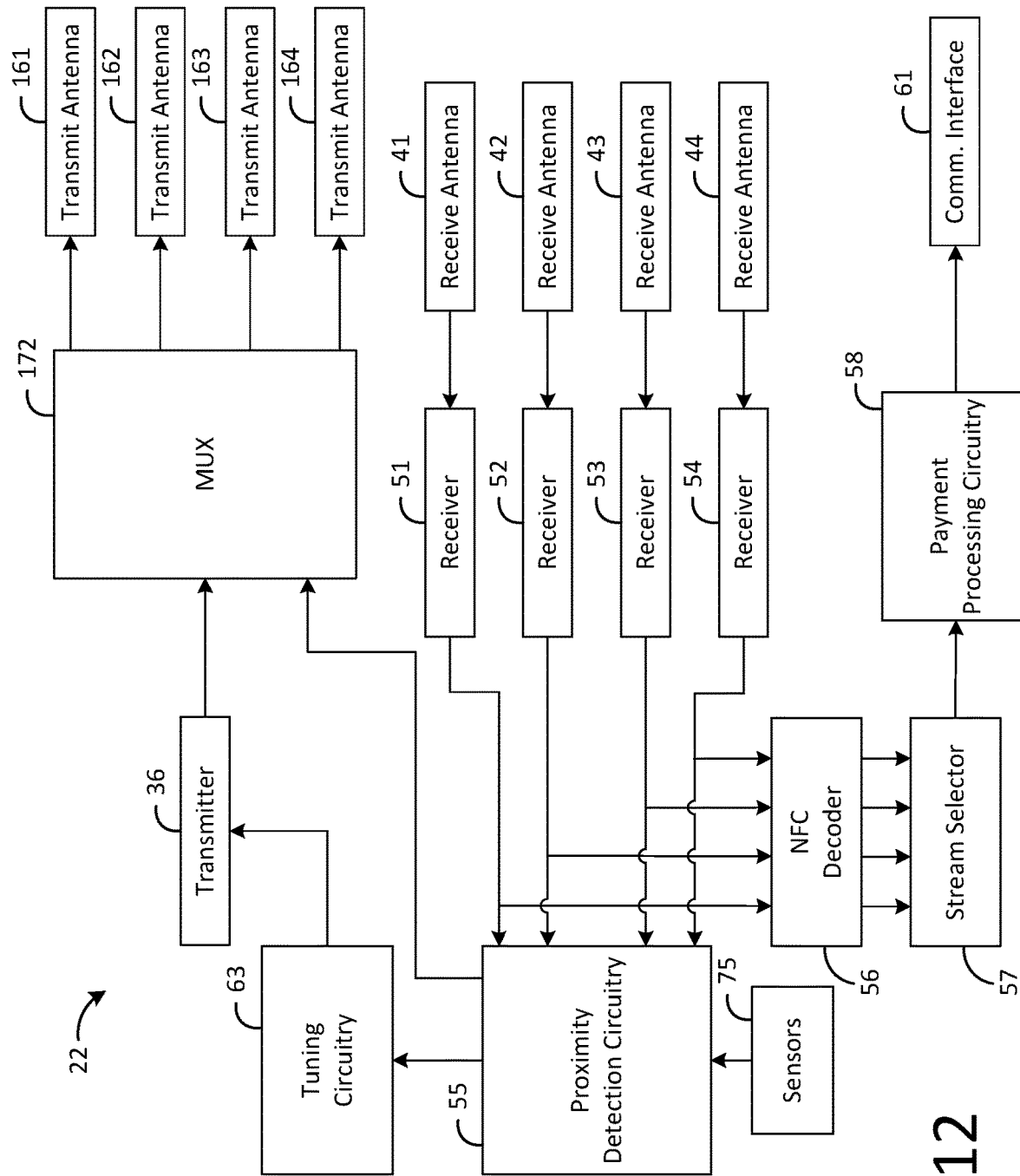
FIG. 12 depicts an illustrative block diagram of a payment reader in accordance with some embodiments of the present disclosure.

In some embodiments, the location of the NFC device 12 may be used to perform other functions in the reader 22 in addition to or in lieu of tuning the transmitter 36. As an example, the location of the NFC device 12 may be used to select one or more transmit antennas for communicating with the NFC device 12. FIG. 12 depicts an exemplary embodiment of a reader 22 having a plurality of transmit antennas 161-164. In the embodiment shown by FIG. 12, each transmit antenna 161-164 is coupled to the transmitter 36 through a multiplexer 172. However, other configurations are possible in other embodiments. As an example, it is possible for each transmit antenna 161-164 to be coupled to a respective transmitter without the use of a multiplexer.

Figure 13:
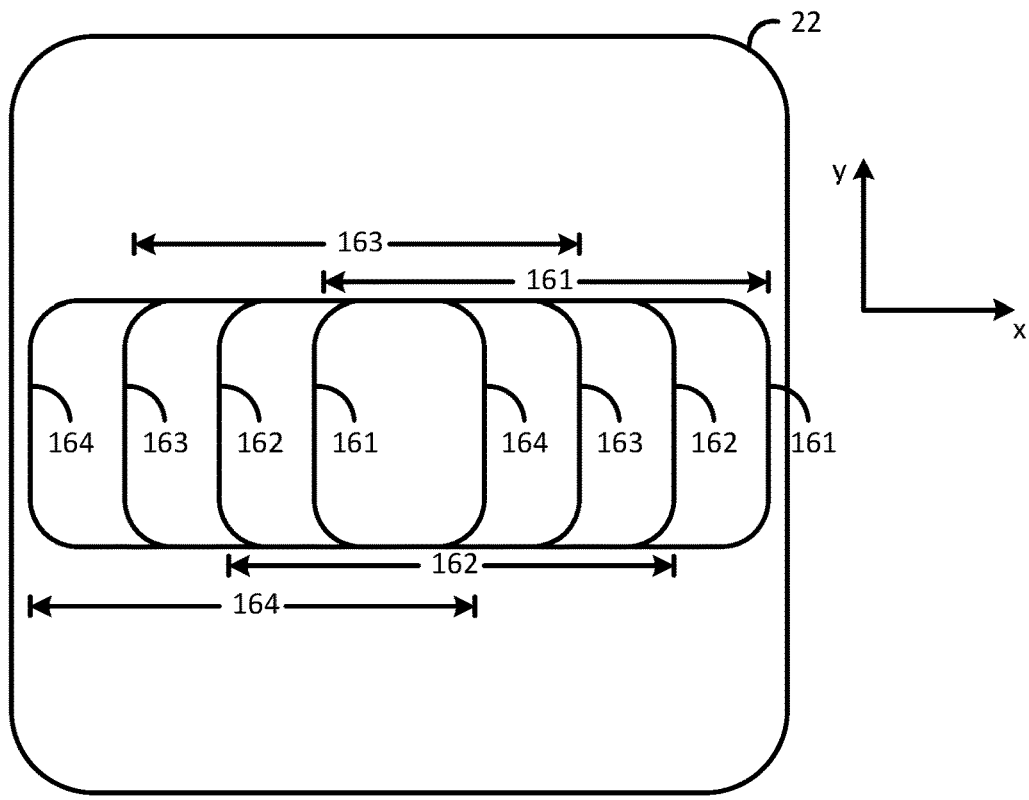
FIG. 13 depicts a top view of an illustrative payment reader in accordance with some embodiments of the present disclosure.

Each transmit antenna 161-164 is preferably positioned at a different location on the reader 22. As an example, FIG. 13 shows an exemplary embodiment for which the transmit antennas 161-164 are positioned at different locations and are overlapping. Other patterns and locations of the antennas 161-164 are possible in other embodiments.

Once the proximity detection circuitry 55 has determined the location of the NFC device 12, as described above, the circuitry 55 may be configured to selectively enable the transmit antennas 161-164 based on the determined location of the NFC device 12. As an example, the proximity detection circuitry 55 may enable the transmit antenna that is better aligned with (e.g., closest to) the NFC device 12 and to disable the other transmit antennas. Thus, the signal strength of the wireless carrier signal received from the enabled transmit antenna should be stronger relative the signal strength of a wireless carrier that would be transmitted from one of the other transmit antennas. If the NFC device 12 is moved to a different location so that it is better aligned with another transmit antenna, then this other transmit antenna may be selected for communication with the NFC device. Thus, as the NFC device 12 moves within the test volume 33, the antenna that is likely to provide the strongest wireless carrier signal to the NFC device 12 is selected for communication and enabled while the other transmit antennas are disabled. Selective use of multiple transmit antennas 161-164 in this way may help to eliminate dead zones within the test volume 33 and ensure that the NFC device 12 receives a strong signal. That is, selection of the transmit antenna 161-164 to communicate with the NFC device 12 is optimized based on the NFC device's current location in order to ensure that the NFC device 12 receives a strong signal from the reader 22 regardless of its location within the test volume 33.

Note that there are various techniques that can be used to enable and disable the transmit antennas 161-164. In the embodiment depicted by FIG. 12, the proximity detection circuitry 55 controls the multiplexer 172 in order to control selection of the transmit antenna 161-164 to be used for communication. In this regard, the proximity detection circuitry 55 controls the multiplexer 172 such that the transmit antenna 161-164 selected for communication receives the carrier signal from the transmitter 36 while the remaining transmit antennas do not. In other embodiments, other techniques for enabling and disabling the transmit antennas 161-164 are possible. As an example, if multiple transmitters 36 are used, the proximity detection circuitry 55 may control the transmitters such that only the one that is coupled to the transmit antenna 161-164 to be enabled actually transmits the carrier signal.

In other embodiments, it is possible for multiple transmit antennas 161-164 to be enabled for communicating with the NFC device 12. However, enabling more than one transmit antenna 161-164 for communication has various disadvantages that can be avoided by enabling only one transmit antenna 161-164 at a time. For example, enabling multiple transmit antennas 161-164 increases power requirements and can also create interference between the multiple carrier signals that are being transmitted. Further, when multiple transmit antennas 161-164 are turned on, it is possible for the antennas 161-164 to detune one another. Selecting only one transmit antenna 161-164 for communication helps to provide a more efficient solution and, in particular, helps to reduce power and increase reliability of the data communications.

As described above, it is possible to use one or more receive antennas 41-44 to receive signals that are used for both data communication and proximity detection of the NFC device 12. In addition, the stream selector 57 may be configured to select a data stream from one of the receive antennas 41-44 for processing a payment transaction or other type of transaction by the circuitry 58. As an example, cyclic redundancy check (CRC) data or other types of data used for detecting errors may be included in the information transmitted by the NFC device 12, and the stream selector 57 may be configured to use such information to detect errors in the received data streams. The stream selector 57 may be further configured to count the errors from each receive antenna 41-44 over a given time window, and select the data stream from the receive antenna 41-44 associated with the lowest error count. The stream selector 57 may then send the information from the selected data stream to the payment processing circuitry 58 for use in processing the payment transaction. In other embodiments, other techniques for selecting the data stream to be used for the payment transaction are possible.

As an example, it is possible for the proximity detection circuitry 55 to inform the stream selector 57 of the location of the NFC device 12 and for the stream selector 57 to then select the data stream from the receive antenna 41-44 that is better aligned with (e.g., closest to) the NFC device 12. In yet other embodiments, other techniques for selecting the desired data stream to use for further processing are possible. In addition, in other embodiments, the information from the stream selector 57 may be used for other purposes or types of transactions. That is, the use of the reader 22 in performing payment transactions is unnecessary, and the reader 22 may be used in the same way as described above in order to process other types of transactions.

Note that simultaneous use of multiple receive antennas 41-44, as described above, does not have the same disadvantages that are associated with simultaneous use of multiple transmit antennas 161-164. In this regard, the receive antennas 41-44 can be passive such that they do not consume any power from the battery or other power resources of the reader 22. That is, the receive antennas 41-44 do not increase the power requirements of the reader 22. Further, since the receive antennas 41-44 are passive, they do not have a tuning circuit, and their impedance does not load the tuning circuitry 63.

In addition, there is not a stringent impedance requirement for passive receive antennas 41-44. In some embodiments, transparent materials, such as Indium Thin Oxide (ITO), may be used for the receive antennas 41-44 instead of opaque materials having a higher conductance, such as copper. By using transparent materials, the receive antennas 41-44 can be placed on a surface of the reader 22 without adversely affecting the aesthetic appearance of the reader to users. As an example, if the reader 22 has a display device, such as a liquid crystal display (LCD), the receive antennas 41-44 could be placed on or near the surface of the display device in view of the user without being significantly noticeable. Such placement of the receive antennas 41-44 may provide a larger receive area, thereby helping to improve receive sensitivity. Further, placement of the antennas 41-44 on or near the surface of the display device or other surface of the reader 22 may prevent the display device or other components of the reader 22 from significantly attenuating the signal received by the antennas 41-44. That is, such signal does not need to pass through the display device or other components before being received by the antennas 41-44.

Figure 14:
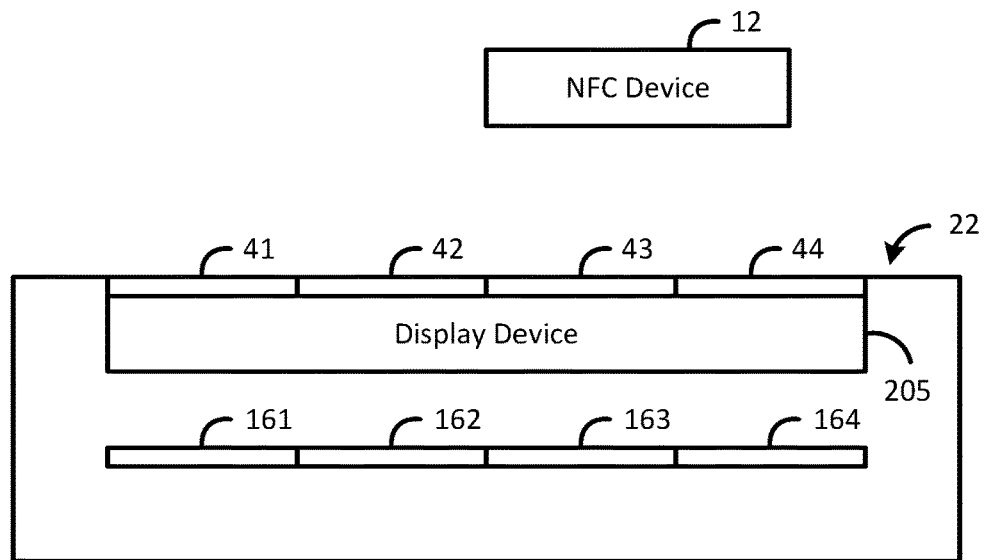
FIG. 14 depicts a side view of an illustrative payment reader in accordance with some embodiments of the present disclosure.

FIG. 14 depicts an exemplary reader 22 having a display device 205, such as an LCD, embedded in or otherwise coupled to the reader 22. As shown by FIG. 14, the receive antennas 41-44 may be composed of a transparent material and positioned on or near a surface of the display device 205. The transmit antennas 161-164, which may be composed of an opaque material, such as copper, may positioned on an opposite side of the display device 205 such that the wireless carrier signal transmitted by one of the transmit antennas 161-164 passes through the display device 205 before reaching the NFC device 12. Such placement of the transmit antennas 161-164 undesirably increases signal attenuation since the wireless carrier signal passes through the display device 205, but the transmit antennas 161-164 are hidden by the display device 205 so that they do not adversely affect the aesthetic appearance of the reader 22. In other embodiments, other configurations and placement of the antennas 41-44 and 164-164 are possible.

Note that, in several embodiments described above, the circuitry of the reader 22 is shown as disparate blocks for illustrative purposes. It is unnecessary for the circuitry to be separated or segmented in any manner, and it is possible for the same set of circuitry to be used for multiple blocks. As an example, the term "circuitry" may be used to refer to any block of circuitry shown by the figures or to refer collectively to multiple blocks. As an example, circuitry may include a processor that is programmed with instructions for performing functions of the tuning circuitry 63, functions of the proximity detection circuitry 55, and/or functions of the payment processing circuitry 58. Moreover, the same hardware resources, such as one or more processors or other types of circuitry, may be used to implement the functionality of multiple blocks.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. A near field communication (NFC) system, comprising:
   an NFC device configured to receive a wireless carrier signal and modulate the wireless carrier signal with data; and
   an NFC reader having a transmit antenna and a plurality of passive receive antennas, the NFC reader configured to wirelessly transmit the wireless carrier signal via the transmit antenna and receive the modulated wireless carrier signal with the plurality of passive receive antennas, the NFC reader having circuitry configured to provide a plurality of data streams based on the modulated wireless carrier signal, each of the plurality of data streams defining data recovered from the modulated wireless carrier signal received from a respective one of the plurality of receivers, the circuitry further configured to select, based on a location of the NFC device relative to the NFC reader, one of the plurality of data streams for use in processing a transaction.

2. The NFC reader of claim 1, wherein at least one of the plurality of passive receive antennas is positioned on a surface of the NFC reader.

3. The NFC reader of claim 2, wherein the at least one of the plurality of passive receive antennas is composed of a transparent material.

4. The NFC reader of claim 3, wherein the transparent material is Indium Thin Oxide (ITO).

5. The NFC system of claim 1, wherein the circuitry comprises a stream selector and payment processing circuitry, the stream selector configured to select one of the plurality of data streams for forwarding to the payment processing circuitry, wherein the payment processing circuitry is configured to receive the selected one of the plurality of data streams and to process a payment transaction based on the selected one of the plurality of digital data streams.

6. The NFC reader of claim 5, wherein the stream selector is configured to compare errors associated with each of the plurality of digital data streams and to select the one of the plurality of digital data streams based on comparisons of the errors.

7. The NFC reader of claim 5, wherein the circuitry is configured to detect a location of the NFC device, and wherein the stream selector is configured to select the one of the plurality of digital data streams based on the detected location of the NFC device.

8. A near field communication (NFC) reader, comprising:
   a transmit antenna;
   a transmitter coupled to the transmit antenna and configured to transmit a wireless carrier signal from the transmit antenna;
   a plurality of passive receive antennas;
   a plurality of receivers coupled to the plurality of passive receive antennas for receiving from the plurality of passive receive antennas the wireless carrier signal modulated with data from an NFC device; and
   circuitry configured to provide a plurality of data streams, each of the plurality of data streams defining data recovered from the wireless carrier signal received by a respective one of the plurality of receivers, the circuitry further configured to select, based on a location of the NFC device relative to the NFC reader, one of the plurality of data streams for use in processing a transaction.

9. The NFC reader of claim 8, wherein at least one of the plurality of passive receive antennas is positioned on a surface of the NFC reader.

10. The NFC reader of claim 9, wherein the at least one of the plurality of passive receive antennas is composed of a transparent material.

11. The NFC reader of claim 10, wherein the transparent material is Indium Thin Oxide (ITO).

12. The NFC reader of claim 8, wherein the circuitry is configured to compare errors associated with each of the plurality of data streams and to select the one of the plurality of data streams based on comparisons of the errors.

13. The NFC reader of claim 8, wherein the circuitry is configured to detect the location of the NFC device and to select the one of the plurality of data streams based on the detected location of the NFC device.

14. The NFC reader of claim 8, wherein the transaction is a payment transaction.

15. A method for use with a near field communication (NFC) reader, comprising:
   transmitting a wireless carrier signal from a transmit antenna of the NFC reader;
   receiving, with a plurality of receivers from passive receive antennas of the NFC reader, the wireless carrier signal modulated with data from an NFC device;
   providing a plurality of data streams, each of the plurality of data streams defining data recovered from the wireless carrier signal received by a respective one of the plurality of receivers;

selecting, with circuitry of the NFC reader based on a location of the NFC device relative to the NFC reader, one of the plurality of data streams for use in processing a transaction; and processing, with the NFC reader, the transaction using the selected data stream.

16. The method of claim 15, wherein at least one of the plurality of passive receive antennas is positioned on a surface of the NFC reader.

17. The method of claim 16, wherein the at least one of the plurality of passive receive antennas is composed of a transparent material.

18. The method of claim 17, wherein the transparent material is Indium Thin Oxide (ITO).

19. The method of claim 15, further comprising comparing, with the circuitry, errors associated with each of the plurality of data streams, wherein the selecting is based on the comparing.

20. The method of claim 15, further comprising detecting the location of the NFC device with the circuitry, wherein the selecting is based on the detected location of the NFC device.

* * * * *